United States Patent Office 3,293,403
Patented Dec. 20, 1966

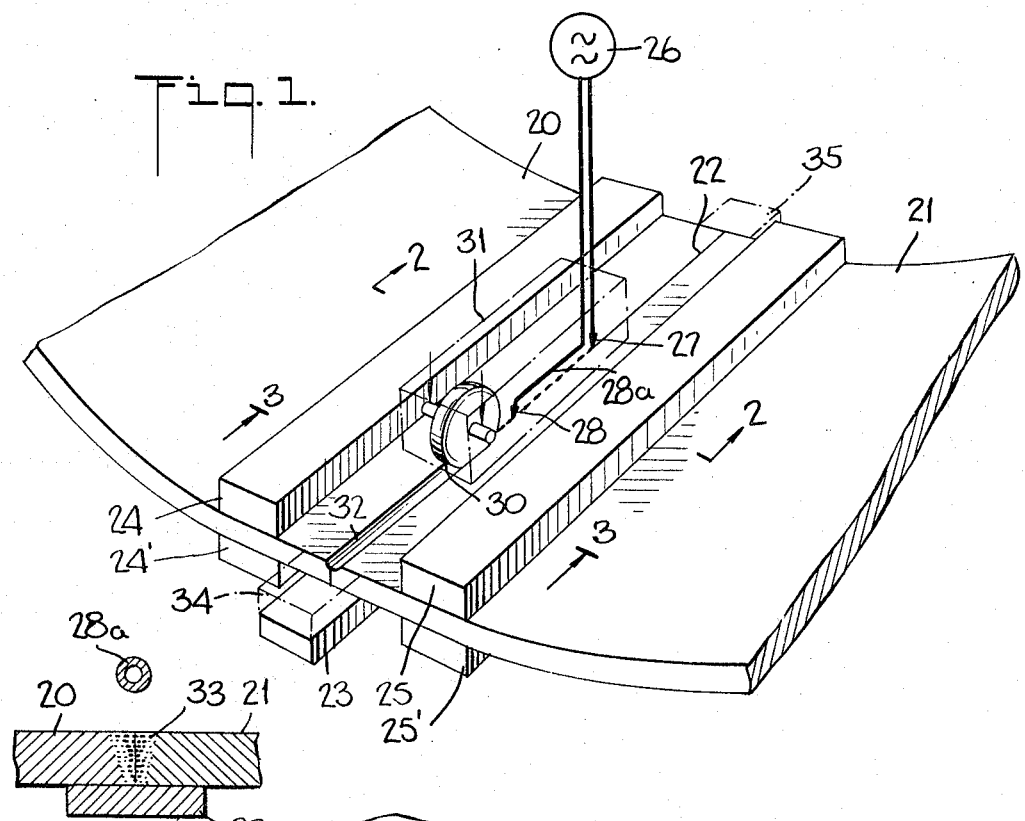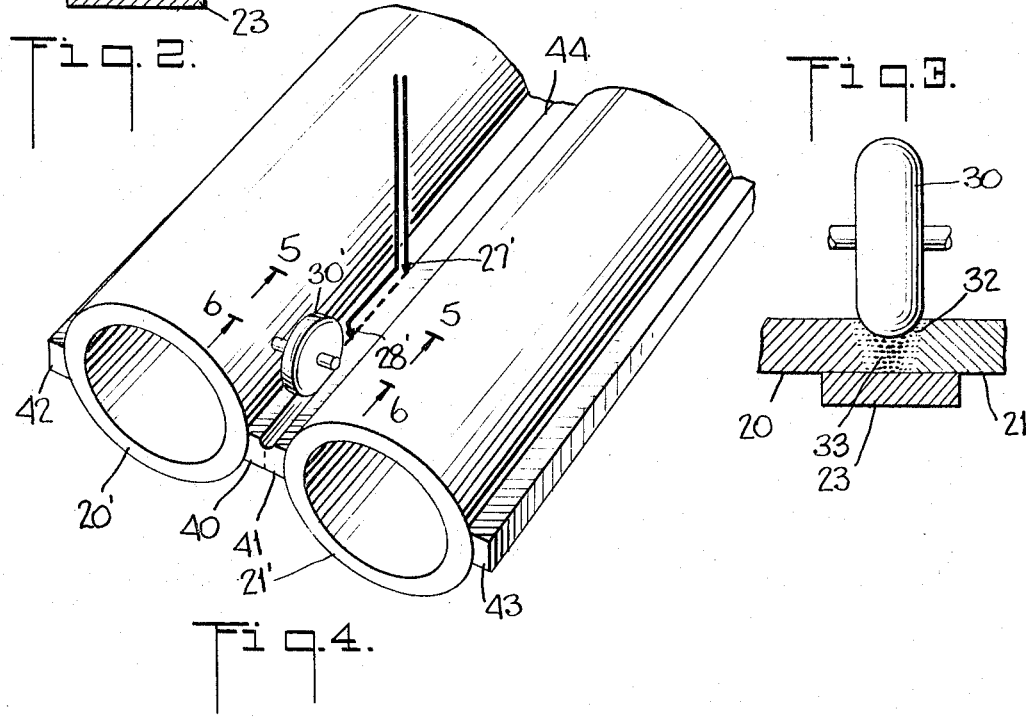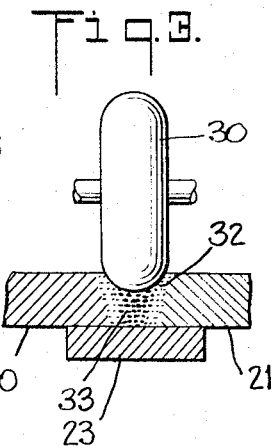

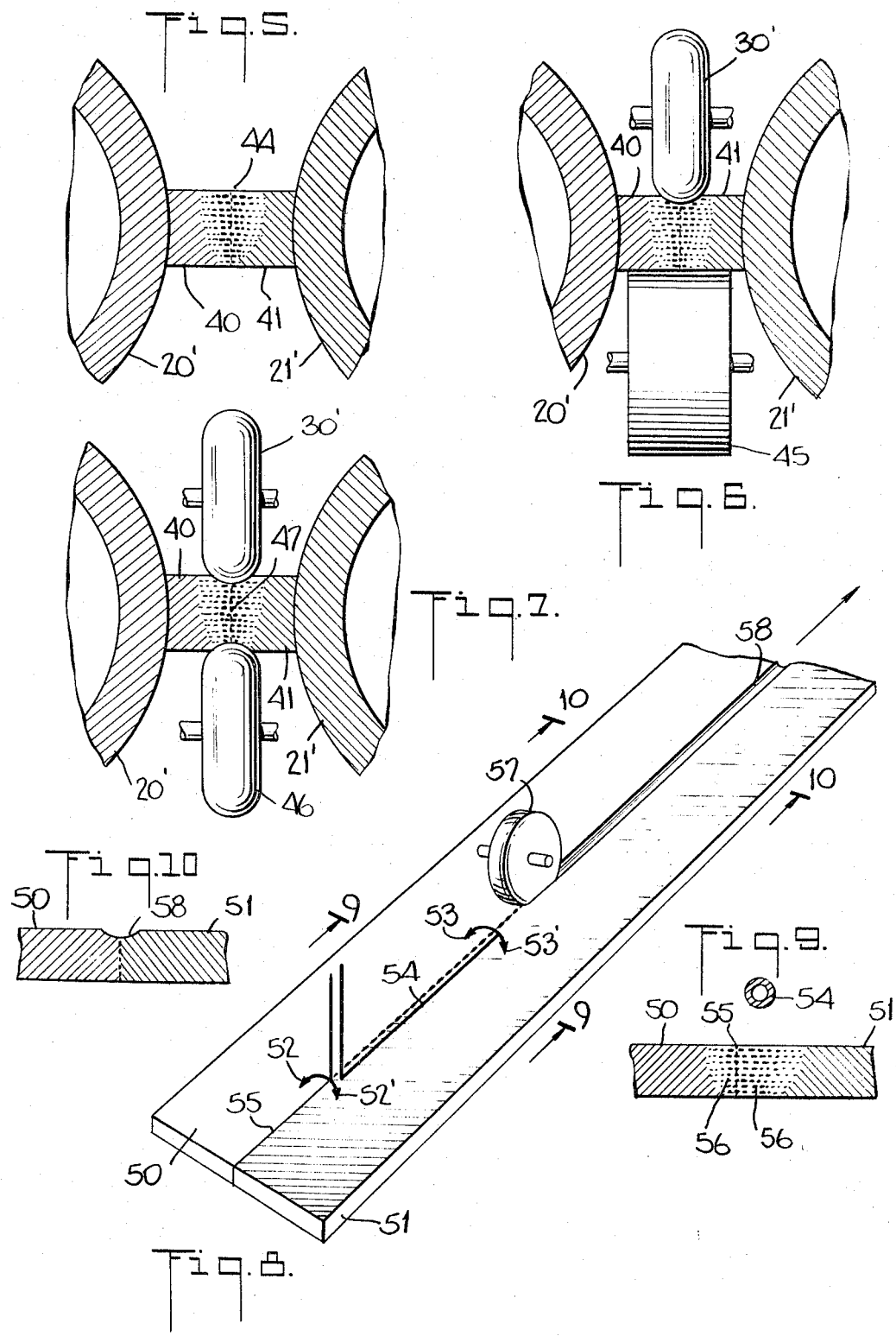

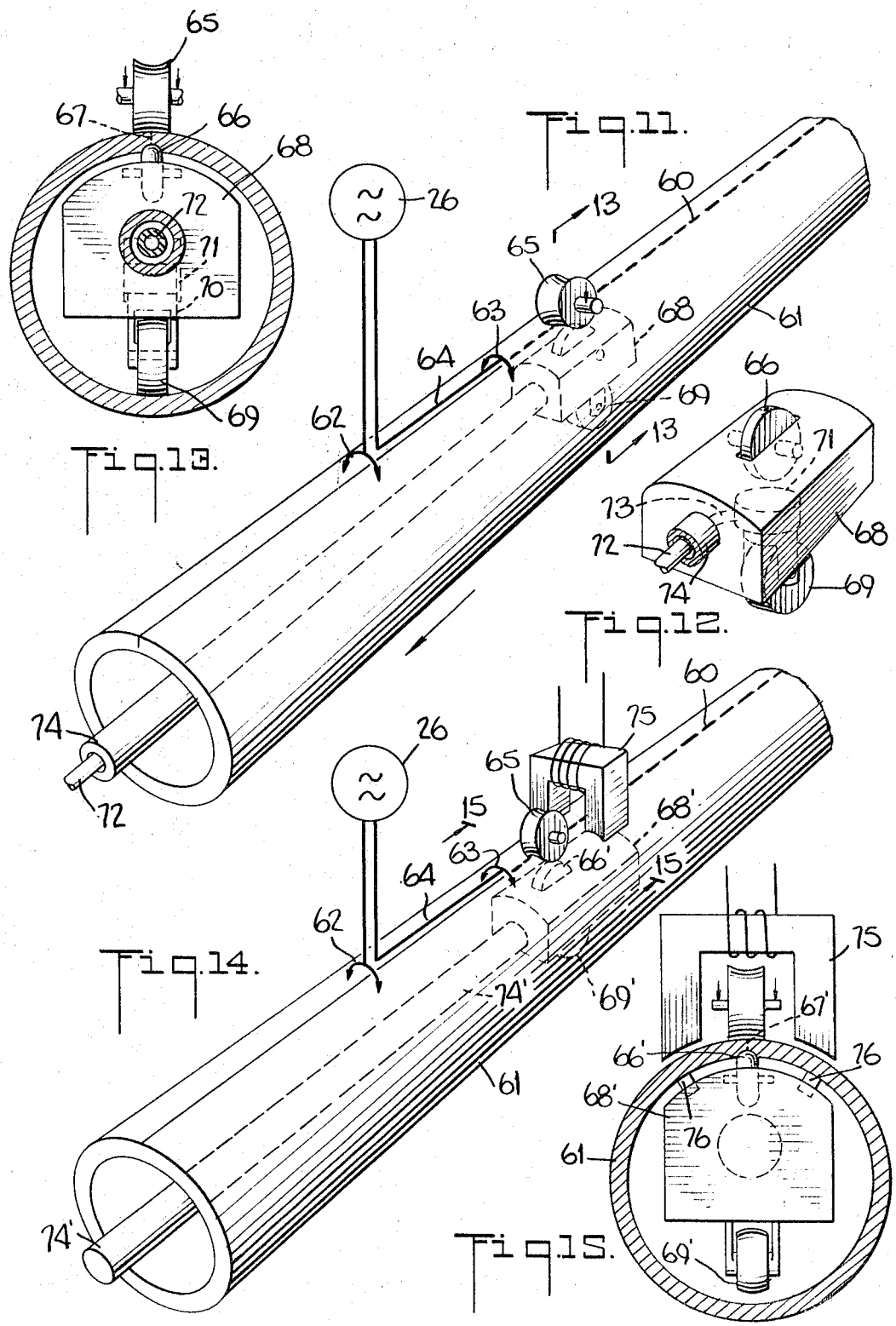

3,293,403
BUTT WELDING OF METAL MEMBERS BY HIGH
FREQUENCY HEATING CURRENT
Wallace C. Rudd, Larchmont, N.Y., assignor to American Machine & Foundry Company, New York, N.Y., a corporation of New Jersey
Filed Apr. 21, 1966, Ser. No. 544,293
17 Claims. (Cl. 219—104)

This invention relates to methods and apparatus for forming butt welds and the like between metal portions by the use of high frequency heating current.

In U.S. Patent to Rudd and Stanton No. 2,857,503, granted October 21, 1958, various methods and apparatus are disclosed for forming elongated welded seams by high frequency resistance heating, the terminals from the current source benig applied respectively at successive points along the desired seam line on the longitudinally-advancing workpiece. Such methods operate quite satisfactorily for forming a butt weld along the seam line in cases where the workpieces being welded together may, as same are being advanced past the weld point, be readily forced under pressure together by pressure rolls at the sides as for example in a case where the metal portions being welded comprise opposed edges of a longitudinal gap in an advancing tube, and which readily may be advanced between pressure rolls past the weld point.

There are various situations, however, where it is quite impractical or highly inconvenient to force the metal members together at the weld point as by the use of pressure rolls at opposite sides of the weld point. For example, if it is desired to weld one end of a long coiled metal strip to the end of another such strip so as to make a butt weld therebetween, it is not possible to establish the pressure between the edges to be welded by the known method above referred to, and in various other instances where it may be desired to form a butt-welded joint between two sheets, the two sheets would have to be in some often-times impractical manner forced into one another at an angle in order to create the pressure therebetween necessary to upset and cause welding of same together.

The present invention provides a convenient and relatively simple way of meeting this problem while still performing the step per se of applying the high frequency heating current in the known manner above referred to, that is by the use of so-called "in-line" electrodes. According to the present invention, the edges of two metal sheets which are to be welded together are placed in abutment and rigidly held in alignment with each other and preferably with some form of back-up bar or support extending along beneath the abutting edges. Then the high frequency current is applied along the line of the abutting edges by the above-referred-to in-line electrode arrangement as the electrode arrangement and the work are uniformly moved relative to each other longitudinally of the desired seam line. Then, just following the trailing contact, pressure is applied, for example by a suitably-shaped roll, to force some of the plastic metal which is located along closely adjacent the seam line, down against the abutting edges, so that the metal, which is now heated throughout the depth of the abutting edges, is brought under sufficient pressure to cause welding of the one edge to the other. The rate of travel of the workpiece with respect to the contact arrangement and the power level, is such as to heat the abutting edge portions of the sheet to welding temperature. Applicant's co-pending U.S. application Serial No. 510,502, filed November 30, 1965, discloses a method of welding, for example, one sheet of metal to another sheet thereunder, along a desired weld line, by applying high frequency current to the upper surface of the upper sheet by the use of the aforesaid in-line electrode system, the current having such frequency and the members having such resistivity and relative permeability, that the current penetrates to a so-called "reference depth" such as to penetrate through the contacting surfaces and heat same to welding temperature, that method now being sometimes referred to as the "high frequency current penetration method of welding." Similarly with the present invention, the current is caused to penetrate and heat to welding temperature the metal throughout the depth of the abutting edges at the seam line of the desired butt weld. With the present invention the applied pressure along the desired seam line, as applied downwardly by a pressure roll, which may have its periphery rounded in cross-section, reacts against the back-up bar or support for the workpieces so as to form a shallow groove along the upper side of the seam line. The metal displaced from such groove and as confined by the still-solid adjacent metal, is thus substantially confined on all sides under pressure, whereby the butting edges become securely welded together, without the necessity of using squeeze rolls at opposite sides of the seam line.

Various modifications and adaptations of the invention are possible, some of which will be described hereinafter, one example comprising the welding of finned tubes together for the formation of so-called boiler water walls in panels. Another embodiment of the invention makes possible the efficient welding along a desired seam line of metal portions which are constituted of metals having different electrical, magnetic or heat-conductive properties.

Other embodiments of the invention described below concern the welding of longitudinal seams on tapered metal tubing.

The invention is adptable for use with conveniently available high frequency sources of power which may have frequencies say as low as about 4000 cycles per second up to 500,000 cycles per second or higher. While preferably for efficiency and uniformity of results, the current is applied by in-line contacts or electrodes as aforesaid, the invention in certain of its aspects may conceivably be carried out with high frequency current inductively applied, preferably as by an elongated induction coil suitably constructed substantially to confine the induced current closely along a single line on the work.

Various further and more specific objects, features and advantages of the invention will appear from the description given below, taken in connection with the accompanying drawings, illustrating by way of example preferred forms of the invention.

In the drawings:

FIG. 1 is a perspective view, with parts broken away, illustrating somewhat schematically one of the preferred examples of the invention;

FIGS. 2 and 3 respectively are sectional views taken substantially along lines 2—2 and 3—3 of FIG. 1;

FIG. 4 is a perspective view showing somewhat schematically the principal parts of an alternative embodiment of the invention adapted for welding finned tubes together to form panels thereof such as for boilers;

FIG. 5 is a sectional view taken substantially along line 5—5 of FIG. 4;

FIG. 6 is an end view of portions of FIG. 4;

FIG. 7 is a view similar to FIG. 6 but showing a modification;

FIG. 8 is a somewhat disagrammatic perspective view showing the principal portions of still another embodiment adapted for welding portions formed of metals having different properties respectively;

FIGS. 9 and 10 are sectional views taken respectively substantially along lines 9—9 and 10—10 of FIG. 8;

FIG. 11 is a somewhat schematic perspective view of another alternative embodiment such as adapted for longitudinally welding a seam line in tapered tubes;

FIG. 12 is a somewhat schematic perspective view of a roll assembly such as used in the interior of the arrangement of FIG. 11;

FIG. 13 is a sectional view taken substantially along line 13—13 of FIG. 11;

FIG. 14 is a somewhat schematic perspective view similar to that of FIG. 11 but showing a form of construction in which roll means interiorly of the tube is held in place magnetically; and FIG. 15 is a sectional view taken substantially along line 15—15 of FIG. 14.

Referring in further detail to FIG. 1, two strips of sheet metal are indicated at 20, 21, which are to be butt welded along a seam line 22. One or both of these strips may comprise the end portions of large coils of the metal strip material, for example, of which it is desired to weld the strip ends together for more convenient handling of same during finishing or other processing operations. As shown, the abutting strip end edge surfaces are brought into contact at the desired seam line and in a position to rest along on a back up bar or other supporting means 23, while suitable clamping means having pairs of clamping jaws 24, 24' and 25, 25', are provided and mounted on any suitable means to respectively engage the upper and lower surfaces of the ends of strips 20 and 21 and thus to hold them securely in place on the back-up bar 23 while the welded seam is being formed. High frequency current from a suitable source, as indicated at 26, is provided, with terminal connections running to a pair of so-called "in-line" contacts or electrodes 27 and 28, which engage the metal of the workpieces at or adjacent the seam line. Such connections should contain cooling fluid as usual for high frequency current apparatus. A portion of one or another of these connections to the electrodes, for example the portion indicated at 28a, is positioned to extend along closely above the seam line to act as a so-called "proximity conductor" whereby the high frequency current will be concentrated (and its consequent heating effect also concentrated) rather closely along the region of the seam line, as hereinafter further explained in connection with FIGS. 2 and 3. A pressure roll 30 is mounted, if desired, on suitable unitary assembly frame means together with the electrodes, within the region indicated by the dotted line 31 and so that either this assembly may be uniformly moved longitudinally relative to the seam line, or, in case it is more convenient to maintain the contacts and roll means stationary, then the workpiece assembly with its clamping and supporting means may instead be moved longitudinally of the seam line during the welding operation. In some cases, if desired, the roll 30 may be used as a contact in lieu of the electrode 28, and thus the initial compressing of the metal may be made to occur immediately upon heating same to optimum temperature. The metal of the workpieces will be first heated to welding temperature along between the two electrodes, whereupon, preferably promptly, this somewhat molten metal is subjected to pressure by the roll 30 to cause the workpiece to be "necked down" as at 32 so as to present a shallow groove along the seam line, as best indicated in FIG. 3. The periphery of the roll 30 may be suitably curved or rounded in cross-section, as shown. The current is caused to penetrate at the region of the desired butt weld to an extent such as indicated by the dotted areas 33 in FIGS. 2 and 3, with the consequence that the metal nearest to or on the abutting end surfaces at least, will be made substantially softened or plastic and heated to welding temperature by the time same passes the region of the electrodes. It will be apparent that the thus-heated metal will be confined in an elongated pocket-like region at the abutting ends of the workpieces, and thus when same is engaged by the pressure roll 30, the metal on each side of the parting line between the abutting edges will be forced under pressure into welded relation, because it will be confined by the bottom portions of the workpiece ends as supported on the back-up bar 23 and the sides of the heated metal will be restrained by the still-solid, unheated metal more remote from the abutting ends. In this way heavy pressure can be brought to bear forcing the end edge surfaces into welded relation, even though the pressure for doing so is applied downwardly instead of from opposite directions horizontally, as was done as per U.S. Patent No. 2,857,503.

If the workpieces are such that the seam line is relatively short and in cases where it is important to have the welded seam extend entirely to the edges of the workpieces, suitable conductive tabs, as at 34, 35, may be mounted by any suitable supporting means in positions respectively at the ends of the desired seam line, such tabs serving to conduct the current from one of the electrodes to the other when the electrode assembly is in the process of starting the heating at one end of the seam line, as well as when same are in the process of terminating the heating at the other end of the seam line.

If desired, also the back-up bar or support sometimes may be replaced by a roll beneath the edges of the workpieces, preferably one of sufficient width to avoid indenting the underside of the seam line region. One example of this is shown in FIG. 6 described hereinafter.

With the arrangement of FIG. 4, a pair of finned tubes, as at 20', 21', having fins, as at 40, 41, 42 and 43, are having their fins 40, 41 welded together along a seam line 44 by the use of an assembly of contacts and a pressure roll 27', 28' and 30' in a manner similar to the operation of FIG. 1. The region through which the high frequency current preferably penetrates is indicated by the dotted area in the sectional view of FIG. 5, as taken along line 5—5 of FIG. 4, and it is, of course, in this region that the metal, particularly at the abutting surfaces at the seam line, becomes well heated to welding temperature, while the metal further to each side of the weld line remains firm, to provide a backing against which the roll 30' may subject the heated metal to sufficient pressure for forming the weld. At the underside of the seam line in FIG. 4, a supporting roll, as at 45 (FIG. 6) preferably of considerable width, is mounted beneath the roll 30', in which case the region at the seam line on the undersurface will remain flat. But, if preferred, in the interests of high speed or otherwise, a roll such as at 46 may be used as in FIG. 7, having a rounded periphery like that of roll 30', so as to cause the metal to be "necked down" both at the upper and lower surfaces along the butt weld. This form will insure to a highly reliable degree that the metal will be welded throughout at the portions of the seam line indicated at 47. The patterns of heating indicated in FIGS. 2, 3 and 5 to 7 may readily be secured utilizing frequencies in the range of about 4000 to 10,000 cycles per second, or, if desired, frequencies within higher ranges above mentioned.

As above mentioned, FIG. 8 concerns an embodiment of the invention wherein workpieces of two different types of metals are being welded together, by way of example a strip of steel 50 and a strip of copper 51. Here the arrangements and method may be similar to those above described, but with one significant variation. That is, the two strips of different metals may have quite different magnetic properties, resistivities and thermal capacities, and if same are to be satisfactorily welded, it is important that each reaches its individual, appropriate welding temperature. This may be accomplished in a very convenient and simple way with the present invention, as will now be described.

Preferably, although not necessarily, the electrode means for each terminal respectively of the high frequency sources, may be constituted of a pair of contacts, as at 52, 52', and 53, 53', contacts 52 and 53 engaging one of the workpieces, and the contacts 52' and 53' engaging the other. At least one of the connections to the high frequency source, for example connection portion 54, extends along close to the desired seam line 55, but in this instance not directly above the seam line or in a position symmetrical in relation thereto, since in this case, where the workpieces are of steel and copper as examples, with a symmetrically-positioned proximity conductor portion, the steel would become rather violently overheated and melted before the copper reached anywhere near welding temperature. This arises from the fact that, with magnetic metal, the heating thereof by high frequency current is much more easily accomplished, as is well known, than is the case with non-magnetic metal. Hence here, to avoid this difficulty in one possible way, the proximity conductor or return conductor portion 54 is, as shown in FIGS. 8 and 9, mounted substantially to one side of the seam line 55, at a position over the copper or non-ferrous workpiece 51. As a consequence, the current flowing along the region of the abutting edges to be welded, will be concentrated along paths indicated by the dotted areas 56, 56' in FIG. 9; that is, as shown, a greater portion of the current will tend to be concentrated along within the copper member than along within the edge portions of the steel member and thereby the edge surface of the copper member may be brought up to its proper welding temperature substantially concurrently with the bringing of the edge surface portions of the steel member up to their welding temperature. By trial, tests and by taking into consideration the so-called "reference depth" of penetration of high frequency current at different frequencies and for metals having different resistivities and permeabilities (such as per the tabulation in U.S. Patent 3,037,105 of Fred Kohler), one may so place the proximity conductor 54 as per FIGS. 8 and 9 herein, that the current in the edges of the two metal portions of different metals will penetrate and cause heating of each of the abutting metal edge surfaces throughout to its own desirable welding temperature, while leaving the metal spaced further away from the desired seam still in firm condition. Thus, when a pressure roll as at 57 in FIG. 8 engages the heated seam line, the metal will be "necked down" and the butt weld will be formed along beneath a groove 58.

While with the methods of this invention in typical cases, due to the "necking down" of the metal along the seam line, its thickness and accordingly its strength may be reduced substantially as compared with a weld to the full normal depth of the metal, yet the strength will be ample in cases such as where it is desired to join the ends of coils of strips, as above mentioned, and similar purposes, and also for purposes of making longitudinally welded tube panels, and tapered tubes such as lamp posts, as described below, in which the weld strength factor is not so important as is the matter of accomplishing the weld inexpensively and rapidly, particularly in situations where the manipulation and pressing together of the workpieces during welding presents unusual problems.

If desired, instead of using a roll such as indicated at 57 for causing "necking down" of metal at the seam line, the two different metals here may be brought into welded relation instead by using a strip of foil, small wire or rod material comprising a filler strip, and formed of the same metal as either of the workpieces or of a suitable alloy, and pressed down against the seam line by a roll having a suitable surface so that the metal of the molten foil or strip will be crowded into the seam line and form a part of the butt weld in the manner described in the co-pending U.S. application of Wallace C. Rudd and Jack Morris, Serial No. 547,942, filed May 5, 1966. Similarly, with the other embodiments of FIGS. 1 to 7 and FIGS. 11 to 17 herein, the "necked down" groove formations might be wholly or partly covered, filled or supplemented by forcing metal from a strip of foil or other filler strip against the heated seam line to accomplish or aid in accomplishing the welding of same utilizing the principles of the aforesaid Rudd and Morris application.

The embodiment shown in FIGS. 11–13 inclusive is adapted for welding a longitudinal seam, as at 60, in a tapered tube 61, such for example as may be used for lamp posts or metal poles for supporting electrical wires, among other purposes. Suitable supporting or clamping arrangements (not shown) may be used to support and advance the tapered tube past contacts 62 and 63 for applying the high frequency current to heat the metal along the desired seam line on the workpiece, the current being concentrated as by a proximity conductor portion 64 as in the above-described embodiments. After the region of the seam line has been heated, it passes under a pressure roll 65, which may react against a pressure roll 66 located internally of the tubing and having a rounded periphery so as to force the heated metal upwardly from the inner surface at the seam line within the tube, thus subjecting the metal between the rolls 65 and 66 to sufficient confined pressure to form a forged weld, as indicated at 67 (FIG. 13).

The roll 66 may be carried on a suitable mounting block 68, at the underside of which there is a supporting roll 69 for engaging the lower inside surface of the tubing. As this roll advances along within the tapered tubing, and as the radius of the tubing becomes smaller, it will be necessary to provide means permitting the roll 69 gradually to rise, and with the construction shown in FIGS. 11 to 13 this may be accomplished by mounting this roll at the lower end of a hydraulic piston 70 which moves up or down within a cylindrical space 71 within the block 68. Hydraulic fluid for maintaining pressure in the space 71 may be carried from a suitable source maintained under pressure into the interior of the tube and into the mounting block 68 through a conduit 72 connected to the cylindrical space as by a cavity 73 (FIG. 12). Thus, as the tubing 61 advances toward the left in FIG. 11 during the process of welding, the roll 69 bearing against the lower internal surface of the tube, will continue to apply pressure to the block 68 and thence to roll 66 maintaining the latter under heavy pressure against the interior of the upper portion of the tubing causing same to be grooved along the seam line, the groove being like those formed on the upper surface at the seam line in the embodiments above described. But as the diameter of the tubing becomes smaller where engaged by roll 69, the hydraulic cylinder and plunger arrangement 70, 71 will permit the roll 69 to rise and thus accommodate the smaller tube diameter. A rigid mandrel 74 may be provided surrounding the conduit 72 for firmly holding the mounting block 68 at the desired position beneath roll 65.

The embodiment shown in FIGS. 14 and 15 is similar to that of FIG. 11, except that here a mounting block 68' for an internal roll 66' is held up at its proper position beneath the seam line by magnetic means. That is, a powerful direct current magnet 75 may be suitably mounted with its pole pieces located at opposite sides of the desired seam line 60 and just above the tubing and the block 68' may be formed of suitable magnetic material so that it will normally be forcefully attracted upwardly toward the pole pieces of magnet 75. The mounting block 68' at its upper side may be provided with suitable replaceable stop members, as at 76, of various heights and inserted in block member 68' to limit the spacing of the latter beneath the upper interior surface of the tube and thus limiting the extent to which the internal pressure roll 66' may be moved upwardly in forming the groove at the line of a weld 67'. While a roll 69' may be provided on the underside of block 68', this will ordinarily not engage the lower interior surface of the tubing except possibly at its point of smallest diameter. In this case a mandrel 74' on which the block 68' is mounted may be relatively rigid and rigidly mounted normally to hold the block 68' at approximately the desired elevation even before the magnet 75 is energized.

It may be observed that, along the region of the seam line on the tapered tubing, the metal portions may be advanced during welding all along a straight horizontal line and without disturbance of this stationary positions with respect to each other of the abutting edge surfaces which will accordingly be accurately welded in alignment.

It will be understood that current-carrying tabs like those at 34 and 35 in FIG. 1 may be applied and suitably supported at the forward and trailing ends of the desired seam line 60 in the embodiments of FIGS. 11 and 14 for the same purpose as in FIG. 1.

While at various points herein the terms "upwardly" and "downwardly" or the like are used for convenience in explaining the operation of the apparatus in the particular positions or orientations as shown in the drawings, it will be understood that these terms are merely relative and that the assemblies of apparatus may be oriented to various desired directions and positions.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for butt welding an edge surface of one metal portion to an edge surface on another metal portion which comprises: positioning said metal portions and retaining same stationary with respect to each other with their said edge surfaces abutting; progressively, along the desired welded seam line at said abutting surfaces, heating said surfaces and the metal closely adjacent thereto substantially throughout the thickness of the metal to welding temperature by the use of high frequency current while the metal portions are being advanced longitudinally of said desired seam line with respect to a predetermined weld point; providing means supporting the thus-heated metal of said abutting edge surfaces at least at the region of said point; and while in their relatively stationary positions with respect to each other, also applying pressure thereto in a direction substantially of the plane of said abutting surfaces to bring under welding pressure the thus-heated metal as confined by the supporting means and by the metal which remains solid along regions spaced somewhat from the seam line.

2. Method in accordance with the foregoing claim 1 and in which said high frequency current is conductively applied to the metal portions to flow between successive points at said seam line and, while the current and the resulting heating of the metal are being concentrated along said line by a proximity conductor portion positioned therealong and carrying said current, the pressure being applied to the heated metal at the seam line by a roll which depresses the metal along the seam line.

3. Method in accordance with claim 1 and in which the pressure is applied to the heated metal by a roll forming a grove along the seam line.

4. Method in accordance with claim 3 and in which the means supporting the heated metal at the weld point also comprises a roll engaging the metal at the seam line and forming a groove along the metal surface at the seam line opposite to said aforementioned groove.

5. Method in accordance with the foregoing claim 2 and in which conductive members are applied respectively to extend in advance of the leading end of the seam line and to the rear of the trailing end thereof to provide paths for said current to permit the metal to be heated to a welding temperature starting at the leading end of the seam line and continuing to the trailing end thereof.

6. Method in accordance with claim 1 and in which said metal portions are formed of different metals, one of which is more readily heated by high frequency current than the other, said method being further characterized in that said current is applied conductively at two successive points along the desired seam line and between which the current flows; concentrating the current along such seam line by a proximity conductor portion extending along in spaced relation to such line and carrying such current; and positioning said proximity conductor portion along in an offset relation to said line so as to be closest to the metal portion which is less readily heated by said current.

7. Method in accordance with the foregoing claim 1 and in which said metal portions comprise portions of a tapered tube which extend along a desired longitudinal seam line on the tube, said method being further characterized in that the means for supporting the heated metal at the region of the weld point comprises a roll exerting pressure in opposition to another roll which applies the pressure along the seam line, one of said rolls being mounted externally of the tube at the seam line and the other internally of the tube.

8. Method in accordance with the foregoing claim 1 and in which said metal portions comprise portions of a tube which extend along a desired longitudinal seam line on the tube, said method being further characterized in that the means for supporting the heated metal at the region of the weld point comprises a roll mounted internally of the tube to exert pressure in opposition to another roll which applies pressure along the seam line externally of the tube.

9. Method in accordance with the foregoing claim 8 and in which said roll internally of the tube is shaped to impress a groove in the metal internally of the tube along the seam line.

10. Method in accordance with the foregoing claim 9 and in which said roll internally of the tube is hydraulically held in pressure engagement with the region of the seam line.

11. Method in accordance with the foregoing claim 9 and in which said roll internally of the tube is maintained mounted by means magnetically attracted toward the interior tube wall at the seam line by magnetic means positioned externally of the tubing.

12. Apparatus for butt welding an edge surface of one metal portion to an edge surface of another metal portion which comprises: means for positioning said metal portions and retaining same stationary with respect to each other with their said edge surfaces abutting; means for heating the metal along the desired seam line at said abutting surfaces by high frequency current; means for moving the metal portions relative to said heating means longitudinally of the seam line and past a desired weld point; means for supporting the metal portions in the region of said weld point; a pressure applying roll for pressing the region of the seam line of the metal portions against such supporting means in the direction substantially of the plane of said abutting edge surfaces thereby to compress into welded engagement the metal at said surfaces as confined by the supporting means and by the metal which remains solid along regions near the seam line.

13. Apparatus in accordance with the foregoing claim 12 and in which said current is applied by contacts engaging the metal portions at spaced points along the desired seam line and a proximity conductor is positioned to extend along adjacent the seam line for carrying said current and said pressure applying roll has a rounded peripheral surface for depressing the metal and forming a groove along the seam line.

14. Apparatus in accordance with the foregoing claim 13 and in which said supporting means also comprises a roll for engaging the metal portions at the region of the weld point.

15. Apparatus in accordance with the foregoing claim 12 for welding together edge surfaces formed of different metals, one of which is more readily heated by high frequency current than the other, said apparatus being further characterized in that the high frequency current heating means comprises contacts at successive points along the seam line and a proximity conductor portion extends along in spaced relation to the seam line for carrying such current, said proximity conductor portion extending along in an offset relation to said line so as to be closest to the metal portion which is less readily heated by said current.

16. Apparatus in accordance with the foregoing claim 12 for welding metal portions which comprise edge surfaces of the metal extending along a desired longitudinal seam line on metal tubing, and in which apparatus the supporting means at the region of the weld point comprises a roll and mounting means therefor within the tubing, such mounting means including means for hydraulically pressing said roll into contact with the interior of the tubing along the seam line.

17. Apparatus in accordance with the foregoing claim 12 for welding metal portions which comprise edge surfaces of the metal extending along a desired longitudinal seam line on metal tubing, and in which apparatus the supporting means at the region of the weld point comprises a roll and mounting means therefor within the tubing, such mounitng means including means for magnetically pressing said roll into contact with the interior of the tubing along the seam line, magnetic means being provided externally of the tubing for attracting such mounting means toward the interior wall of the tubing along the seam line.

References Cited by the Examiner
UNITED STATES PATENTS

| | | | |
|---|---|---|---|
| 2,023,085 | 12/1935 | Lavallee | 219—104 |
| 3,073,945 | 1/1963 | Osterer et al. | 219—67 |
| 3,175,069 | 3/1965 | Kohler et al. | 219—59 |

RICHARD M. WOOD, *Primary Examiner.*